US007000496B2

(12) United States Patent
Wessel et al.

(10) Patent No.: US 7,000,496 B2
(45) Date of Patent: Feb. 21, 2006

(54) CABLE RETRACTION MECHANISM FOR TRIGGER SHIFTERS

(75) Inventors: Robert Wessel, Regensburg (DE); Martin Weiss, Schweinfurt (DE)

(73) Assignee: SRAM Deutschland GmbH, Schweinfurt (DE)

( * ) Notice: Subject to any disclaimer, the term of this patent is extended or adjusted under 35 U.S.C. 154(b) by 89 days.

(21) Appl. No.: 10/250,081

(22) Filed: Jun. 2, 2003

(65) Prior Publication Data

US 2003/0221507 A1 Dec. 4, 2003

(30) Foreign Application Priority Data

May 31, 2002 (DE) ................................ 102 24 196

(51) Int. Cl.
*F16C 1/10* (2006.01)
*G05G 1/00* (2006.01)

(52) U.S. Cl. ......................... 74/502.2; 74/488; 74/489; 74/575; 74/577 R; 74/577 M

(58) Field of Classification Search ............... 74/502.2, 74/489, 473.14, 473.28, 506, 527, 575, 488, 74/577 M, 577 R; 280/260
See application file for complete search history.

(56) References Cited

U.S. PATENT DOCUMENTS

| | | | | |
|---|---|---|---|---|
| 5,012,692 | A | 5/1991 | Nagano | 74/475 |
| 5,094,120 | A | 3/1992 | Tagawa | |
| 5,701,786 | A * | 12/1997 | Kawakami | 74/502.2 |
| 5,957,002 | A * | 9/1999 | Ueng | 74/502.2 |
| 6,095,010 | A | 8/2000 | Arbeiter et al. | 74/473.14 |
| 6,450,060 | B1 * | 9/2002 | Shahana | 74/502.2 |
| 6,564,670 | B1 * | 5/2003 | Feng et al. | 74/502.2 |
| 6,694,840 | B1 * | 2/2004 | Kawakami | 74/502.2 |
| 6,729,203 | B1 * | 5/2004 | Wesling et al. | 74/502.2 |
| 6,848,335 | B1 * | 2/2005 | Kawakami | 74/502.2 |
| 2005/0155447 | A1 * | 7/2005 | Ichida et al. | 74/502.2 |

FOREIGN PATENT DOCUMENTS

| | | | |
|---|---|---|---|
| CH | 248670 | 5/1947 | |
| EP | 0 361 335 B1 | 2/1994 | |
| EP | 0 485 863 B1 | 2/1996 | |
| EP | 000785128 A2 * | 7/1997 | 74/489 |
| GB | 2 169 065 A | 7/1986 | |

* cited by examiner

*Primary Examiner*—Vinh T. Luong
(74) *Attorney, Agent, or Firm*—Milan Milosevic; Lisa Wunderlich

(57) ABSTRACT

A bicycle shifter having a housing mountable to a handlebar, a takeup mechanism for pulling a shift cable and a release mechanism for releasing the shift cable. The takeup mechanism includes a takeup tooth segment, a takeup pawl and an actuation element. The release mechanism includes retaining and locking tooth segments, retaining and locking pawls and a release element. The takeup, retaining and locking tooth segments are arranged on one disk element.

19 Claims, 5 Drawing Sheets

CABLE RETRACTION MECHANISM FOR TRIGGER SHIFTERS

BACKGROUND OF INVENTION

The present invention relates to bicycle shifters and more particularly to a bicycle shifter having tooth segments for takeup, retention and release of a shifting cable that are arranged on one disk element.

Trigger shifters are typically used to pull and release a spring-loaded shifting cable, and biased to return to their original positions after they are actuated. Trigger shifters are disclosed in patents EP 0 361 335 B1 and U.S. Pat. No. 6,095,010. The shifters disclosed in these patents have two levers, a takeup lever to wind the spring-loaded shifting cable and a release lever to disengage positioning and retaining devices to release or unwind the shifting cable. The takeup lever rotates a takeup or cable spool by actuating a pawl biased in an engagement direction. The takeup spool is preloaded in the unwinding direction by a return spring acting on the shifting cable. The positioning device retains the takeup spool in a particular shift position, thereby counteracting the return force on the shifting cable.

The positioning device of EP 0 361 335 B1 includes a disk element that is connected nonrotatably to a cable spool and has two tooth segments. First and second pawls alternately engage the two tooth segments, respectively. The release operation is accomplished in two stages: the first pawl, initially engaged, is disengaged from the first tooth segment allowing the disk to rotate with the cable spool until the second pawl engages the second tooth segment. When the release lever returns to its initial position, the second pawl is disengaged from the second tooth segment allowing the disk element to further unwind until the first pawl once again engages the first tooth segment.

The positioning device disclosed in U.S. Pat. No. 6,095,010 includes first and second disk elements that are connected nonrotatably to the cable spool and are engageable by first and second latching lugs, respectively, of the release lever. Upon actuation of the release lever, the positioning device is disengaged to permit unwinding or release of the shift cable. The release operation takes place in two stages: the first latching lug, initially engaged, is disengaged from the tooth segment of the first disk element as the second latching lug engages the tooth segment of the second disk element. The first and second disk elements rotate with the cable spool until the second latching lug engages the corresponding retaining tooth of the second disk element. When the release lever returns to its starting position, the second latching lug is disengaged from the tooth segment of the second disk element and the cable spool continues to rotate until the first latching lug engages a next retaining tooth of the first disk element. After actuation, both levers are returned to their original positions by a return spring. During the takeup operation, the spring-loaded pawl ratchets over the sawtooth contours of the tooth segment on the second disk element.

The above shifters require three peripheral tooth segments to implement the shifting operation. One tooth segment is used for the takeup operation, the other two tooth segments for the retention and release operations. Several problems are associated with these types of shifters. For example, only two tooth segments may be arranged on the periphery of a disk element because of the multiple gear ratios, thereby requiring a second disk element for the third tooth segment.

Another problem is that many components are needed for the takeup and release operations. For example, the shifter must have a takeup lever with a return spring, a cable spool operably connected to multiple disk elements, a positioning device with locking pawls and a preloaded spring, and a release lever with a return spring. Such a large number of components need to be precisely coordinated with each other, are costly to manufacture and assemble, and require a larger shifter housing.

SUMMARY OF INVENTION

It is an object of the present invention to provide a simplified shifter, with a reduced number of components, without impairing its overall function. It is a further object to reduce, the production and assembly complexity, as well as the weight and bulk of the shifter.

In contrast to the above shifters, the present invention does not require a second disk element. Instead a single disk element includes at least one interior tooth segment, the other two tooth segments preferably arranged on the periphery of the disk element. The internally located tooth segment may be equipped with internal or external teeth. Preferably, internal teeth are used because they have a larger usable tooth diameter. The internally located tooth segment may be used for the takeup, retention or release operations. Further, in a preferred embodiment, a pawl shaft and a takeup pawl engagement region are integrally formed, thereby eliminating a component and allowing more compact packaging.

The shifting mechanism of the present invention for actuating a bicycle transmission, is substantially arranged around a carrier plate and a central shaft, and encased in a housing and an enclosing element. The enclosing element preferably includes a thread for a shifting cable adjustment screw. The shifter is mounted to the handlebar by a handlebar attachment that includes a handlebar clamp preferably integrated with the housing and a screw. The shifter includes a gear indicator, preferably including a flexible indicator strip that is displaceable along the handlebar clamp within the rider's field of view. The indicator strip is operably connected to the cable spool and is protected from the outside environment by a transparent cover. To improve viewability, the indicator cover may include a magnifying lens. The indicator strip has a laterally arranged tooth segment that engages a tooth set on the cable spool. Upon rotation of the cable spool, the indicator strip is displaced to display the current shift position.

The cable spool is nonrotatably connected to the disk element which includes the three tooth segments. The disk element rotates the cable spool into the desired gear and retains it in that position. Two of the tooth segments are preferably arranged on the periphery of the disk element. A third tooth segment is preferably located in an opening in the disk element. This third tooth segment preferably has inwardly directed sawtooth-shaped teeth engageable by the takeup pawl for stepwise winding of the shifting cable onto the cable spool in the takeup direction. In alternative embodiments, two tooth segments may be located internally on the disk element and the third tooth segment on the periphery.

The takeup pawl is mounted on the actuation element and pivots about a pawl shaft that is preferably substantially perpendicular or parallel to the central shaft. Since preferably, the actuation lever is arranged below the carrier plate, and the disk element with the takeup tooth segment is arrange above the carrier plate, the takeup pawl engages the disk by either reaching around or preferably through the carrier plate. When the pawl shaft extends parallel to the central shaft, an engagement region of the takeup pawl is offset from a bearing region of the takeup pawl toward the central shaft. During the takeup operation, with its shaft supported by the actuation element at one end and a separator plate at its second end, the engagement portion of the pawl extends through an opening in the carrier plate to engage the takeup tooth segment of the disk element causing it and the cable spool to rotate in the takeup direction. The arrangement of the shifter components around the carrier plate and the central shaft, and the space-saving passage of the slender takeup pawl through the carrier plate to engage the internally located takeup tooth segment, allows for a compact shifter design using a reduced number of components.

In another embodiment, the pawl shaft is eliminated such that the takeup pawl pivots only about an edge or a rounded contour that is supported on a suitable matching contour on the actuation element.

The shifting operation is initiated by moving the actuation element about the central shaft against a return spring. It is possible to shift through one or more gear ratios in a single stroke of the actuation element. When the actuation element is released, it returns to its starting position under the force of the return spring. Preferably, one end of the shaft of the spring-preloaded takeup pawl is mounted to the actuation element, a second end is supported by a separator plate connected to the actuation element. Once the takeup operation has been performed, the cable spool is retained in its new shift position by means of a retaining pawl, also spring-preloaded, that engages a retaining tooth segment preferably on the periphery of the disk element.

The release operation is performed by actuating the release element that includes a return spring. The release element is mounted pivotably about a shaft. The release element may be a release lever. Upon actuation, the release lever bears against a sliding element that includes the retaining and locking pawls and is preloaded toward the retaining teeth, resulting in disengagement of the retaining pawl from the retaining teeth. The retaining pawl and the locking pawl are preferably located on opposite ends of the sliding member and are preferably connected to the sliding element or alternatively form one component. Upon disengagement of retaining pawl, the cable spool, preloaded by the shifting cable, rotates in the unwinding direction until the locking pawl engages the next locking tooth thereby interrupting the unwinding motion. As the release lever is released and moves toward its initial position under the return spring force, the locking pawl is disengaged from the locking tooth segment and the retaining pawl engages a next sawtooth in the retaining tooth segment to interrupt the unwinding of the spool at a next gear position.

These and other features and advantages of the invention will be more fully understood from the following description of certain embodiments of the invention, taken together with the accompanying drawings.

DETAILED DESCRIPTION

Figure 1:
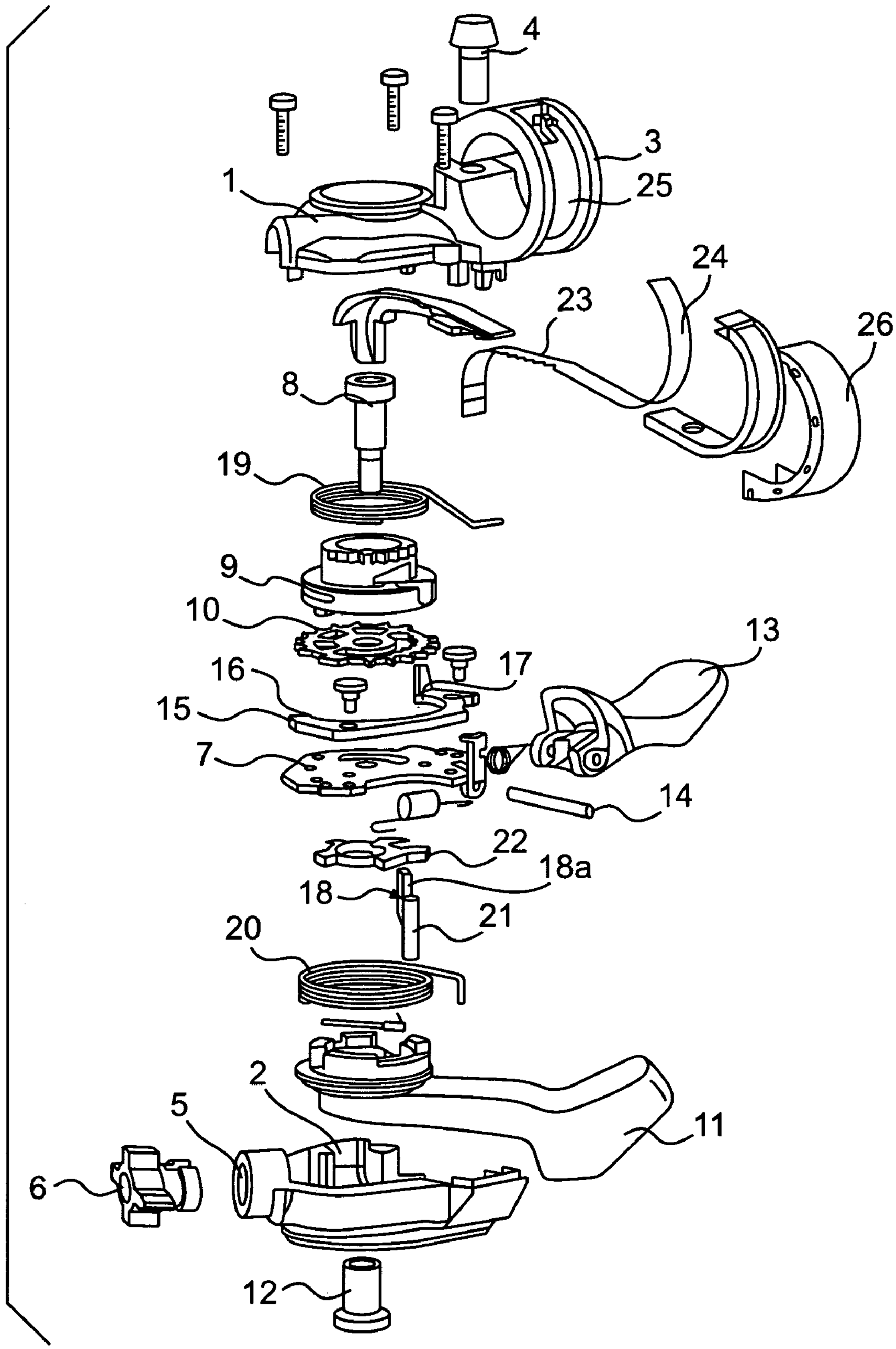
FIG. 1 is an exploded view of a trigger shifter in accordance with one embodiment of the present invention.

The shifter of the present invention generally includes a release mechanism, a takeup mechanism, a cable spool and a gear indicator. A housing 1 and an enclosing element 2 encase the release mechanism, the takeup mechanism and the gear indicator. The housing 1 preferably includes an integrated handlebar attachment including a handlebar clamp 3 and a clamp screw 4. The enclosing element 2 preferably has a thread 5 for receiving an adjustment screw 6 to adjust a shifting cable (not shown). The enclosing element 2 is produced from plastic, without additional machining, and is bolted to the housing 1.

A cable spool 9 is mounted on a central shaft and axially immobilized by a shaft nut 12. One end of the shifting cable is attached to the cable spool 9 for winding and unwinding thereon, the other end to a bicycle transmission.

Figure 2:
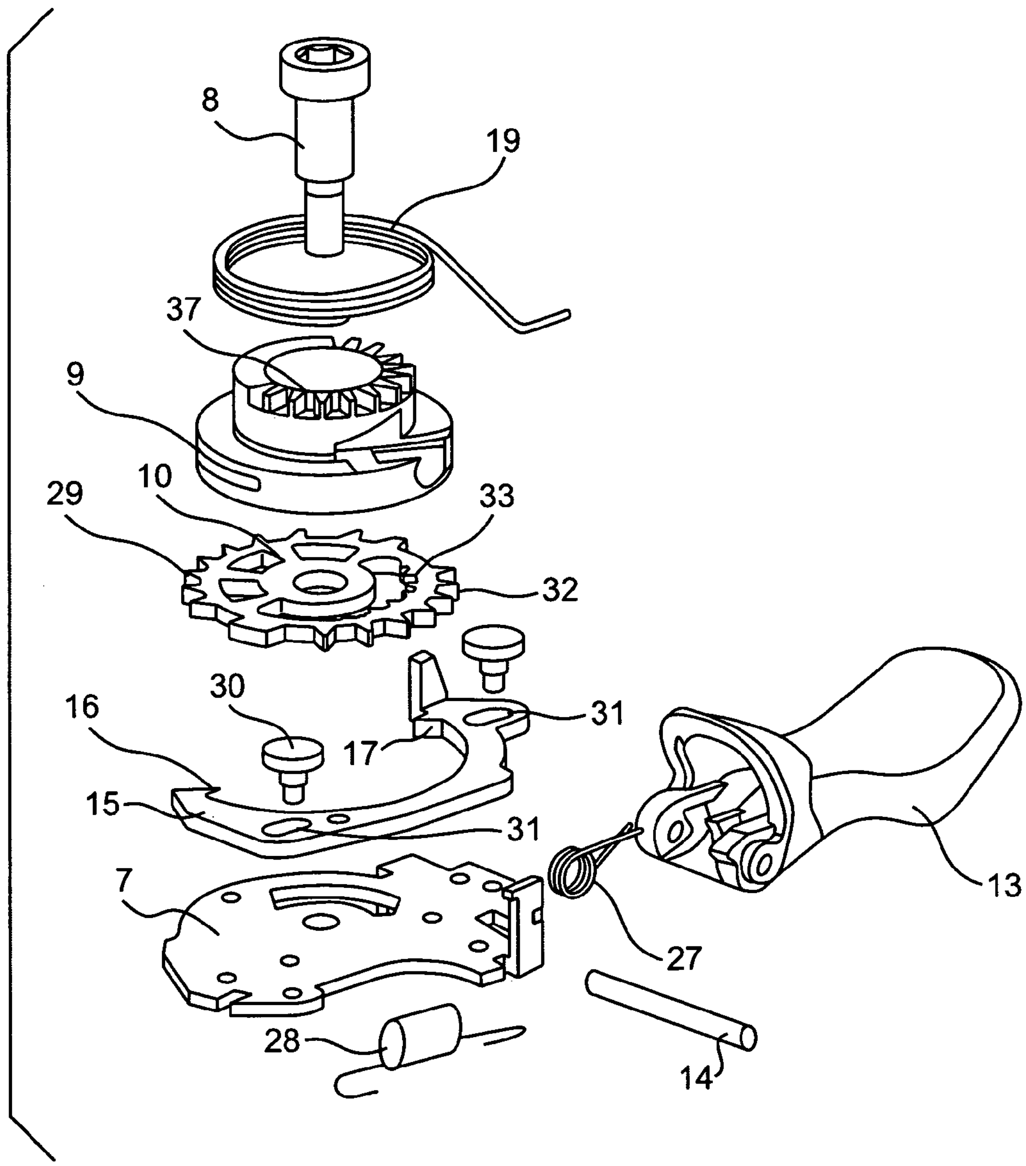
FIG. 2 is an exploded view of a release mechanism of the trigger shifter of FIG. 1.

The release and takeup mechanisms are arranged around a carrier plate 7 and about the central shaft 8. Referring to FIGS. 1 and 2, the release mechanism generally includes a retaining tooth segment 29, a locking tooth segment 32, a retaining pawl 16, a locking pawl 17 and a release element 13. The release element 13 may be a pivot lever that pivots about a shaft 14 that preferably extends toward the central shaft 8. A release spring 27 returns the pivot lever 13 back to its initial position after release of the lever.

Figure 2A:
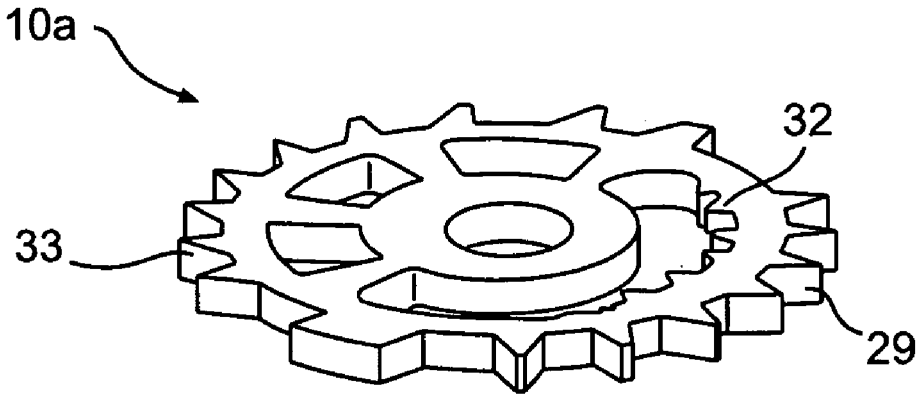
FIG. 2*a* is a perspective view of a disk element of a trigger shifter in accordance with another embodiment of the present invention.
Figure 2B:
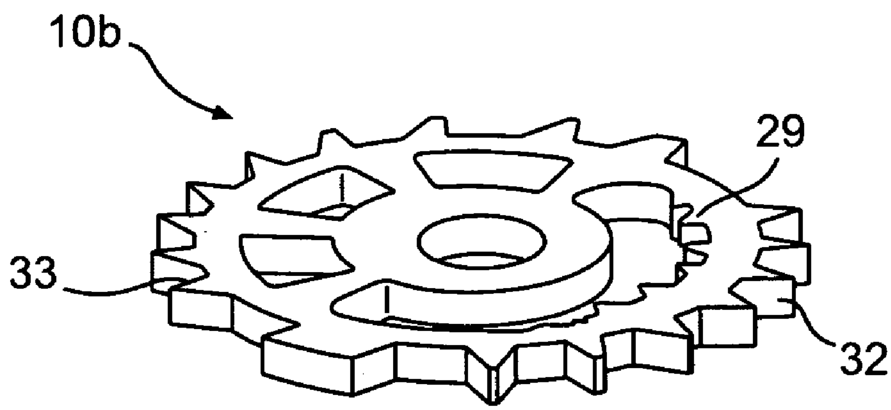
FIG. 2*b* is a perspective view of a disk element of a trigger shifter in accordance with another embodiment of the present invention.

The cable spool 9 and a disk element 10 are mounted on the shaft 8 and axially immobilized by a shaft nut 12. The tooth segments 29, 32 and 33 are arranged on the disk element 10. A sliding member 15 fits around the disk element 10 and includes the retaining pawl 16 at one end and the looking pawl 17 at another end. The sliding member 15 is attached to the housing 1 by two guide pins 30 that are received in two elongated guides 31 of the sliding member 15. A retaining spring 28 biases the retaining pawl 16 of the sliding member 15 to engage the retaining tooth segment 29 of the disk element 10, thereby preventing the disk element 10 or the cable spool 9 from rotating in the unwinding direction. The retaining pawl 16 and the locking pawl 17 alternately engage the two tooth segments 29, 32, respectively, preferably, arranged opposite one another on a periphery of the disk element 10. The locking pawl 17 engages the locking tooth segment 32 during the release operation to permit only a defined release of the cable spool 9. The third tooth segment 33 is preferably arranged inside of the periphery of the disk element 10. The disk element 10 is nonrotatably connected to the cable spool 9, both being preloaded in the unwinding direction by the continuously applied shifting cable tension and by cable spool spring 19. In alternative embodiments, the takeup tooth segment 33 and the retaining tooth segment 29 of the release mechanism may be arranged on a periphery of a disk element 10*a*, and the looking tooth segment 32 is arranged inside of the periphery of the disk element 10*a*, see FIG. 2*a*. Further, the takeup element tooth segment 33 and the looking tooth segment 32 of the release mechanism may be arranged on the periphery of a disk element 10*b*, and the retaining tooth segment 29 is located inside of the periphery of the disk element 10*b*, see FIG. 2*b*.

Figure 3:
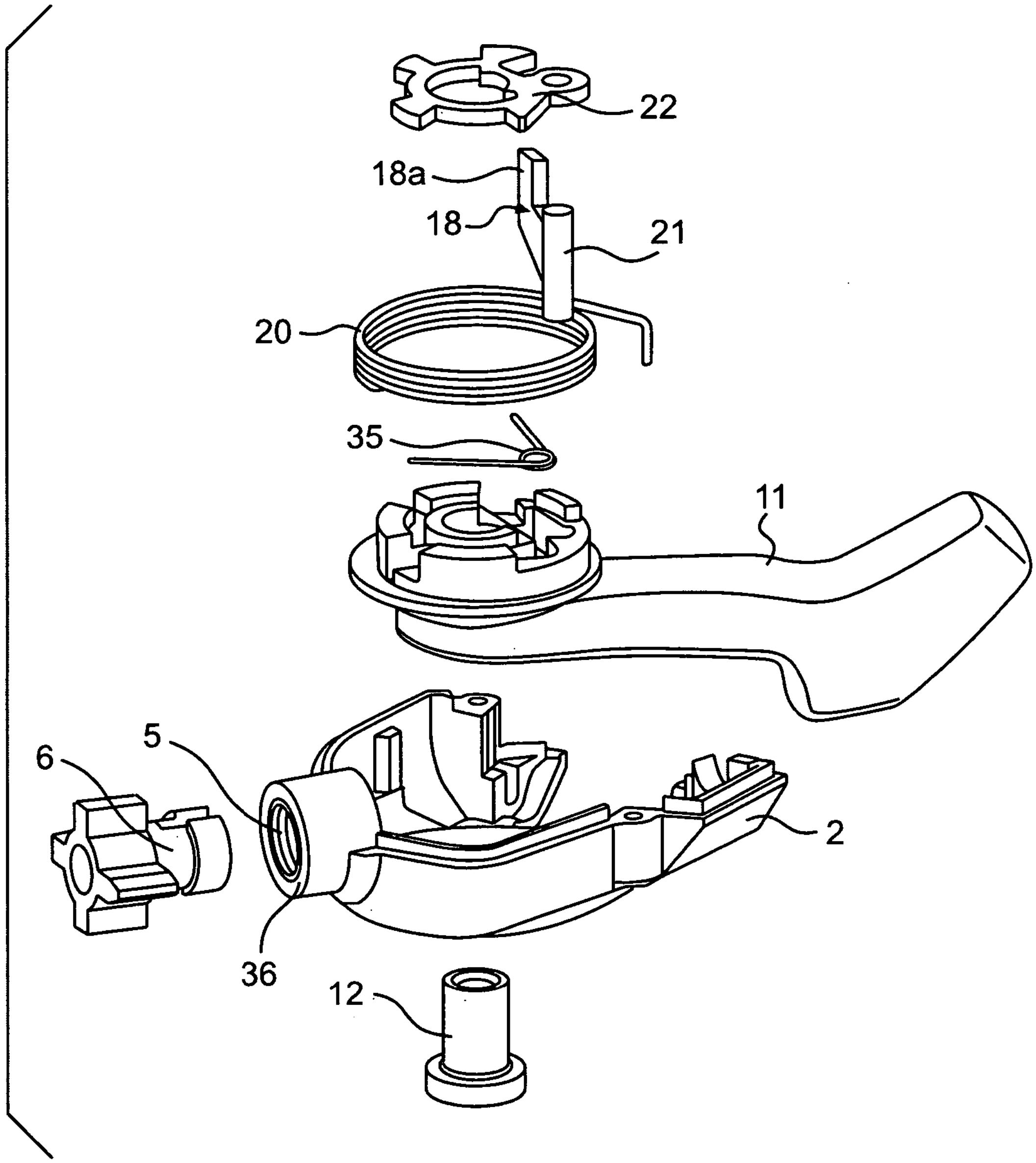
FIG. 3 is an exploded view of an enclosing element and a takeup mechanism of the trigger shifter of FIG. 1.

Referring to FIGS. 1 and 3, the takeup mechanism generally includes a takeup pawl 18, a takeup tooth segment 33 and an actuation element 11. Actuation element 11 may be a lever that pivots about the central shaft 8 and is axially secured with the shaft nut 12. The actuation element 11 is biased toward its starting position by a return spring 20. The takeup pawl 18 is spring-loaded and pivots about a pawl shaft 21, which preferably extends parallel to the central shaft 8 and is mounted at one end to the actuation element 11 and at the other end to a separator plate 22. An outer contour of the separator plate 22 is configured so that it can be placed nonrotatably into a corresponding contour on the actuation element 11.

Takeup pawl 18 includes a bearing region, in this embodiment the pawl shaft 2l, and a slender engagement region **18*a* extending through an opening in the stationary carrier plate 7 to engage the internally located takeup tooth segment 33. The bearing and engagement regions are offset from each other so that the openings in the separator plate 22 and in the carrier plate 7 only have to receive the pivoting engagement region 18*a*. Upon actuation of the actuation element 11, the pawl 18 engages the takeup tooth contour 33 of the disk element 10, thereby rotating the disk element 10 and the cable spool 9 into the next gear ratio. The offset arrangement of the bearing and engagement regions of the takeup pawl 18** can also be used in other types of shifters that have takeup and release mechanisms.

During the takeup operation, it is also possible to shift through several gear ratios with one shifting motion or one stroke of the takeup element 11. During the takeup motion, the retaining pawl 16 ratchets over one or more teeth of the retaining tooth segment 29 on the disk element 10 until the desired gear is reached.

Figure 4:
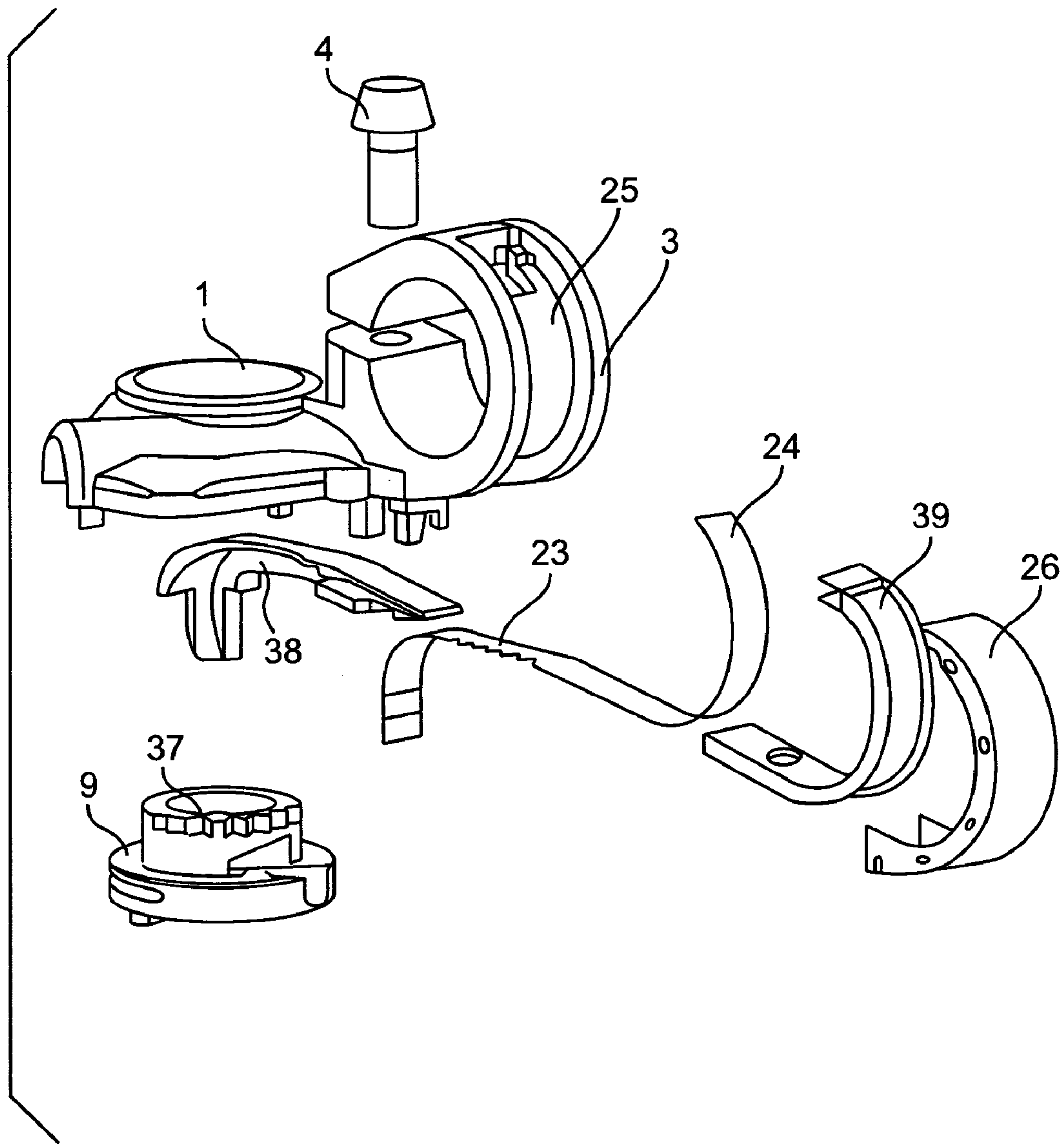
FIG. 4 is an exploded view of a housing and a gear indicator of the trigger shifter of FIG. 1.

Referring to FIGS. 1 and 4, the shifter of the present invention includes a gear indicator having a flexible indicator strip 24 preferably located in the handlebar clamp 3. The flexible indicator strip 24 includes transport teeth 23 that are engageable with a corresponding toothed ring 37 on the cable spool 9. Upon rotation of the cable spool 9, the teeth 23 on the indicator strip 24 engage the teeth 37 of the cable spool 9, thereby displacing the strip 24 to display the current gear ratio in the rider's field of view. The indicator strip 24 is guided around the handlebar along a groove 25 in the handlebar clamp 3. The indicator strip 24 is guided in the region of the transport teeth 23 by a retainer 38, and is guided about the handlebar by an internal guide 39 and on the outer side by a cover 26. The indicator strip 24 is preferably displaceable more than 90 degrees about the handlebar. The groove 25 and the flexible indicator strip 24 are protected from the outside environment by a transparent cover 26. For improved viewability of the gear indicator, the transparent cover 26 may include a magnifying glass.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. A shifter mountable to a handlebar of a bicycle, the shifter actuating a bicycle transmission, a shift cable connecting the shifter to the bicycle transmission, the shifter comprising:

a housing mountable to the handlebar of the bicycle;

a cable spool for winding and unwinding the shift cable thereon;

a takeup mechanism including a takeup tooth segment, a takeup pawl and an actuation element; and a release mechanism having retaining and locking tooth segments, a retention pawl and a locking pawl for retaining and releasing the shift cable and a release element, wherein the takeup, retaining and locking tooth segments are arranged on a disk element, the tooth segments arranged coaxially on the disk element, at least one tooth segment being arranged on a periphery of the disk element and at least one tooth segment arranged inside of the at least one tooth segment arranged on said periphery of the disk element.

2. The shifter as defined in claim 1, wherein the at least one tooth segment arranged inside of the periphery of the disk elelment is located in a disk opening and has an internal tooth set.

3. The shifter as defined in claim 1, wherein the retaining and locking tooth segments for the release mechanism are arranged on said periphery of the disk element, and the takeup tooth segment of the takeup mechanism is located inside of the periphery of the disk element.

4. The shifter as defined in claim 3, wherein the retaining and locking tooth segments for the release mechanism are arranged opposite one another on the periphery of the disk element.

5. The shifter as defined in claim 1, wherein the takeup tooth segment and the retaining tooth segment of the release mechanism are arranged on said periphery of the disk element, and the locking tooth segment is arranged inside of the periphery of the disk element.

6. The shifter as defined in claim 5, wherein the takeup tooth segment and the retaining tooth segment of the release mechanism are arranged opposite one another on the periphery of the disk element.

7. The shifter as defined in claim 1, wherein the takeup tooth segment and the locking tooth segment of the release mechanism are arranged on said periphery of the disk element, and the retaining tooth segment is located inside of the periphery of the disk element.

8. The shifter as defined in claim 7, wherein the takeup tooth segment and the locking tooth segment of the release mechanism are arranged oppositely on the periphery of the disk element.

9. The shifter as defined in claim 1, wherein the disk element is connected nonrotatably to the cable spool and is arranged with the actuation element around a central shaft in the housing.

10. The shifter as defined in claim 9, further comprising a gear indicator having a tooth segment and the cable spool having a toothed ring engageable with the tooth segment of the gear indicator.

11. The shifter as defined in claim 10, wherein the housing includes an integrated handlebar clamp and the gear indicator is an indicator strip that is deflected and guided about the handlebar clamp.

12. The shifter as defined in claim 11, wherein the indicator strip is deflected more than 90 degrees about the handlebar clamp and is guided by a transparent cover.

13. The shifter as defined in claim 1, wherein the release element is mounted on a carrier plate and the takeup mechanism is arranged beneath the carrier plate, the takeup pawl engages through the carrier plate for engagement with the takeup tooth segment on the disk element.

14. The shifter as defined in claim 1, wherein the release element is substantially supported by a carrier plate and is encased by the housing having an integrated handlebar clamp and by an enclosing element having a receptacle for receiving a control cable adjustment device.

15. The shifter as defined in claim 1, wherein the takeup pawl has a bearing region and an engagement region offset from the bearing region toward a central shaft of the shifter.

16. A shifter for a bicycle comprising:

a housing mountable to a handlebar of the bicycle;

a cable spool for winding and unwinding a shift cable thereon;

a release mechanism for retaining and releasing the shift cable;

a takeup mechanism for winding the shift cable about the cable spool, the takeup mechanism including a takeup tooth segment, a takeup pawl and an actuation element, the takeup pawl having a bearing region and an engagement region offset from the bearing region, the takeup pawl rotatable about a takeup pawl axis.

17. The shifter defined in claim 16, wherein the bearing region and the engagement region of the takeup pawl are integrated into one element.

18. The shifter defined in claim 16, wherein the bearing region of the takeup pawl is supported by the actuation element and a separator plate connected to the actuation element.

19. A shifter of a bicycle comprising:

a housing mountable to a handlebar of the bicycle;

a cable spool for winding and unwinding a shift cable thereon;

a release mechanism for retaining and releasing the shift cable; and a takeup mechanism for winding the shift cable about the cable spool, the takeup mechanism including a takeup tooth segment, a takeup pawl and an actuation element, the takeup pawl having a bearing region and an engagement region arranged opposite one another, the bearing region extending substantially perpendicular to a shaft of the cable spool, the takeup pawl rotatable about a takeup pawl axis.

* * * * *